(12) United States Patent
Kelly et al.

(10) Patent No.: US 6,775,216 B2
(45) Date of Patent: Aug. 10, 2004

(54) METHOD AND APPARATUS FOR RESTARTING A WRITE OPERATION IN A DISK DRIVE SYSTEM

(75) Inventors: John J. Kelly, Menlo Park, CA (US); Bing Xiao, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/943,373

(22) Filed: Aug. 29, 2001

(65) Prior Publication Data

US 2002/0114244 A1 Aug. 22, 2002

Related U.S. Application Data

(60) Provisional application No. 60/228,964, filed on Aug. 29, 2000.

(51) Int. Cl.[7] .................................................. G11B 7/00
(52) U.S. Cl. ............................ 369/53.37; 369/47.52; 369/53.26
(58) Field of Search ......................... 369/53.37, 53.26, 369/53.27, 47.52

(56) References Cited

U.S. PATENT DOCUMENTS

| | | | | |
|---|---|---|---|---|
| 4,845,720 A | * | 7/1989 | Koishi et al. ................... 372/31 |
| 4,858,220 A | * | 8/1989 | Funada ......................... 369/116 |
| 5,134,606 A | | 7/1992 | Sekiguchi et al. |
| 5,212,678 A | | 5/1993 | Roth et al. |
| 5,216,660 A | | 6/1993 | Iimura |
| 5,436,880 A | | 7/1995 | Eastman et al. |
| 5,450,383 A | | 9/1995 | Call et al. |
| 5,463,607 A | | 10/1995 | Roth et al. |
| 5,625,615 A | | 4/1997 | Dente et al. |
| 5,675,568 A | * | 10/1997 | Hajjar et al. ................ 369/116 |
| 5,790,491 A | | 8/1998 | Jaquette et al. |
| 5,815,472 A | * | 9/1998 | Kuroda et al. ........... 369/47.33 |
| 5,822,288 A | | 10/1998 | Shinada |
| 5,825,729 A | * | 10/1998 | Ogasawara et al. ...... 369/44.27 |
| 5,867,513 A | * | 2/1999 | Sato ............................. 372/32 |
| 6,031,803 A | * | 2/2000 | Kubota et al. ........... 369/116 R |
| 6,072,761 A | * | 6/2000 | Tani ............................ 369/116 |
| 6,122,302 A | * | 9/2000 | Dean ........................... 372/38 |
| 6,169,455 B1 | * | 1/2001 | Yamaguchi ................. 330/279 |
| 6,259,666 B1 | | 7/2001 | Kobayashi et al. |
| 6,269,058 B1 | | 7/2001 | Yamanoi et al. |
| 6,317,405 B1 | * | 11/2001 | Arai ............................ 369/116 |
| 6,333,905 B2 | | 12/2001 | Kobayashi et al. |
| 6,404,713 B1 | * | 6/2002 | Ueki ....................... 369/47.53 |
| 6,538,962 B2 | | 3/2003 | Hyun |
| 6,556,524 B1 | | 4/2003 | Takeshita |
| 6,560,191 B1 | * | 5/2003 | Yamamoto .................. 369/116 |

FOREIGN PATENT DOCUMENTS

| | | | | |
|---|---|---|---|---|
| EP | 1102262 | * | 5/2001 | ........... G11B/20/10 |
| JP | 6-076288 | * | 3/1994 | ............ G11B/7/00 |

OTHER PUBLICATIONS

MAT (machine assisted translation) of JP 06–076288.*
PCT Search Report dated Jun. 25, 2002.

* cited by examiner

Primary Examiner—Aristotelis M. Psitos
(74) Attorney, Agent, or Firm—Blakely Zokoloff Taylor & Zafman LLP; Judith A. Szepesi

(57) ABSTRACT

A method of writing data on a disk includes the step of writing a first subset of data on a disk such that an amount of write power to write the first subset of data is adjusted in a closed-loop operation. A write-power signal representing the amount of write power to write the first subset of data is measured. After a write interruption, such as from a buffer under-run, a second subset of the data is written on the disk in an open-loop operation using the measured write power, such that the second subset of data is adjacent to the first subset of data.

24 Claims, 13 Drawing Sheets

RF Signal

METHOD AND APPARATUS FOR RESTARTING A WRITE OPERATION IN A DISK DRIVE SYSTEM

This application claims priority on and incorporates by reference U.S. patent application Ser. No. 60/228,964, filed Aug. 29, 2000.

BRIEF DESCRIPTION OF THE INVENTION

This invention relates generally to disk drive systems. More particularly, this invention relates to a method and apparatus for restarting an aborted write operation by reducing the amount of time to set laser power within a disk drive system.

BACKGROUND OF THE INVENTION

Personal computers typically connect to an optical disk drive, such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the lengths of the pits and lands are controlled according to a predefined encoding format.

When reading information from the disk, light from a laser beam is directed onto the track and the light beam is reflected back to a photo-sensor. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, which is proportional to the energy of the light in the reflected light beam.

In FIG. 1, the relationship of the RF signal to the pits 36 and lands 38 is shown. A smaller pit 36 or land 38 decreases both the period and the amplitude of the RF signal. The RF signal in the pits 36 and lands 38 has opposite polarity.

One encoding format used in optical disk systems is eight-to-fourteen modulation (EFM). EFM reduces errors by minimizing the number of zero-to-one and one-to-zero transitions. In other words, small pits are avoided. A zero is indicated by no change in the energy of the reflected beam for at least two clock periods. A one is indicated by a change in the energy of the reflected light beam, that is, a pit edge. Applying the EFM encoding rules, a pit or land will have a length corresponding to an amount of time for at least three and up to eleven clock periods and the electronics will output a corresponding voltage waveform as shown in FIG. 1.

When reading data, the RF signal needs to be decoded into a serial digital data signal. In one circuit, to decode the analog RF signal, a comparator compares the RF signal to a reference voltage to generate a digital data signal.

To write data to a CD-Recordable (CD-R) or a CD-Rewritable (CD-RW) disk, power is supplied to the laser which heats and melts a portion of the disk surface to create the pits. The optimum amount of power to supply to the laser depends on the characteristics of the disk, the optics, the laser, the temperature and the recording speed. The amount of write power is determined for each combination of recorder and recording speed at the time of recording.

When writing data on recordable media, a problem known as "buffer-under-run" may occur. Buffer-under-run occurs when the host computer is unable to supply data as rapidly as the data is being recorded onto the media by the recording device. When buffer-under-run occurs, the controller on the recording device indicates an error condition and the write process is aborted.

In hard disk drives, to recover from a buffer under-run, the head is positioned over the sector that was being written when the write aborted and the sector is rewritten. The data that was already written in the sector prior to the buffer under-run is recorded again.

In an optical disk, a buffer under-run almost always results in the interruption of the writing process in the middle of a record. When a buffer-under-run occurs, the writing process is aborted, and the data record remains partially recorded. Because a location on the optical media is typically written once, using conventional methods, it is not possible to re-start the aborted writing process to write the remaining data of the data record at the correct location with sufficient precision to allow the recorded data to be read without excessive errors. Therefore, the media becomes unusable and is discarded.

In view of the foregoing, it would be desirable to provide a method and apparatus to write the unwritten data resulting from an aborted write, starting at the location where the writing process was aborted, with sufficient precision to allow the recorded information to be read without producing excessive errors. As a result, media that would otherwise be discarded, becomes usable.

SUMMARY OF THE INVENTION

The invention includes a method of writing data on a disk. The method includes the step of writing a first subset of data on a disk such that an amount of write power to write the first subset of data is adjusted in a closed-loop operation. A write-power signal representing the amount of write power to write the first subset of data is measured. After a write interruption, such as from a buffer under-run, a second subset of the data is written on the disk in an open-loop operation using the measured write power so that the second subset of data is adjacent to the first subset of data. The open-loop operation has a much faster response time than the closed-loop operation, which allows the second subset of data to be recorded without a noticeable pause between the first and second subsets of data.

The invention also includes a circuit to write data on a disk. The circuit has a write head. A drive circuit provides power to the write head to write data on a disk. A feedback control loop is connected to the drive circuit. The feedback control loop includes a closed-loop feedback path to supply power to the drive circuit during a normal write operation, and an open-loop control to temporarily supply power to the drive circuit to initiate a write operation after suspension of a normal write operation.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
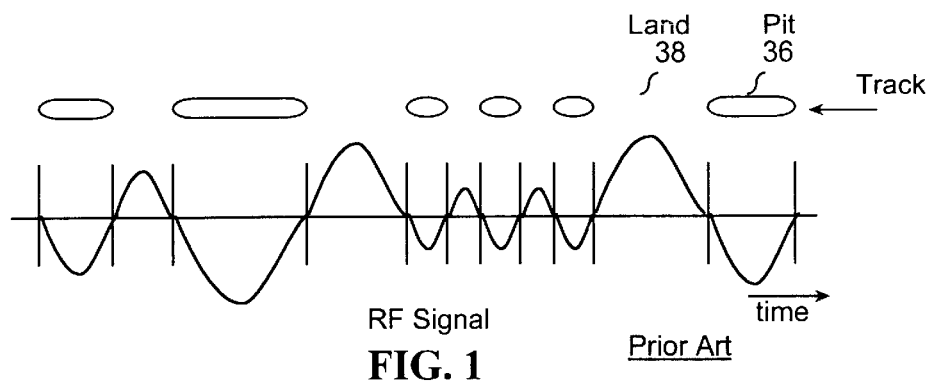
FIG. 1 illustrates the prior art relationship between an analog RF signal and the pits and lands on a disk.
Figure 2:
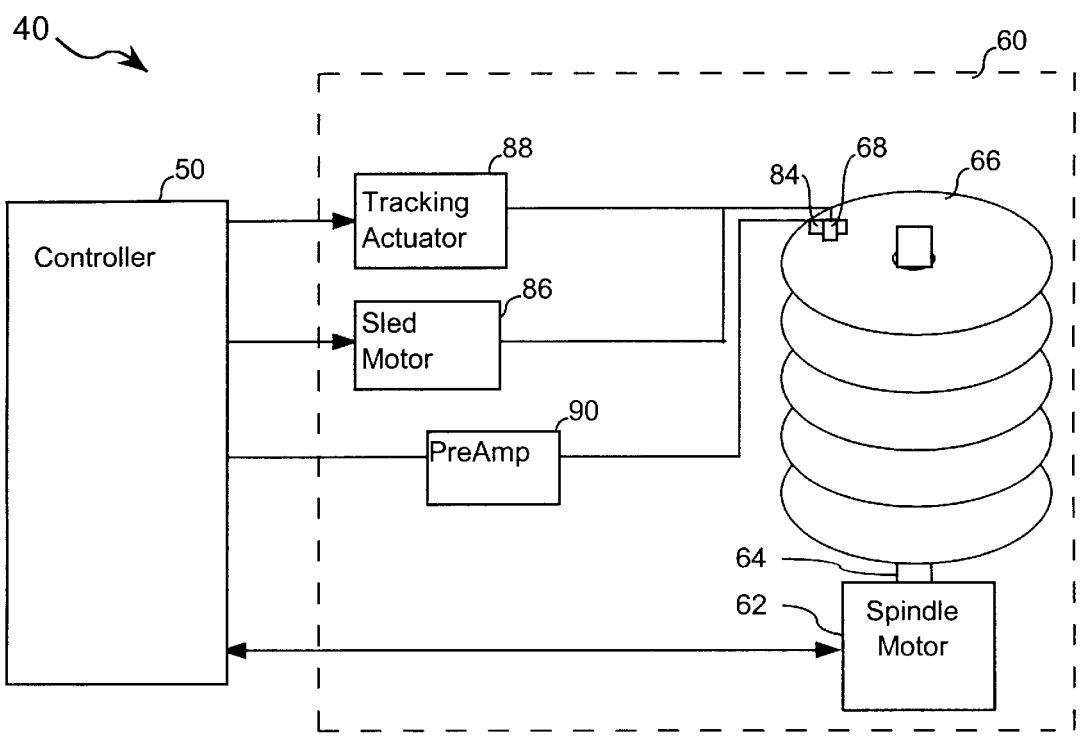
FIG. 2 illustrates a general architecture of a disk drive system in accordance with an embodiment of the present invention.

In FIG. 2, a disk drive system 40 has a controller 50 that connects to a disk drive 60, such as an optical disk drive. In the disk drive 60, a spindle motor 62 is attached to a spindle 64 which supports at least one disk 66. In response to commands from the controller 50, the spindle motor 62 rotates the spindle 64 and therefore the disk 66. While the disk 66 is rotating, a head assembly 68 transmits information from or writes information to the disk 66.

Figure 3:
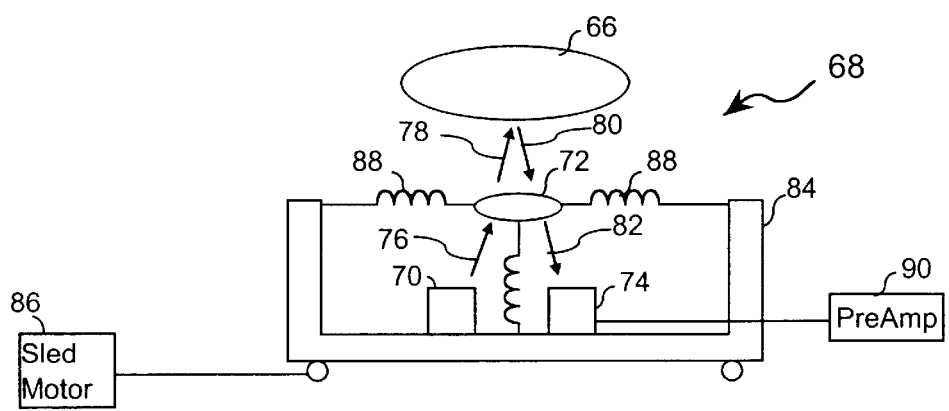
FIG. 3 illustrates a head assembly of FIG. 2.

Referring also to FIG. 3, the head assembly 68 includes a laser diode 70, a lens 72 and a photo-sensor 74. The laser diode 70 projects a light beam 76, 78 via the lens 72 onto a desired location on the disk surface 66. The light beam 80 reflects off the disk surface 66. The lens 72 directs the reflected light beam 82 onto the photo-diode 74, which generates a photo-diode voltage that is directly proportional to the intensity of the reflected light beam. The photo-diode voltage is supplied to the preamplifier 90 for further processing.

To position the head assembly 68 with respect to a desired location on the optical disk 66, the head assembly 68 is mounted on a sled 84, which is moved by a sled motor 86. For more finely positioning the lens 72, a tracking actuator 88 is coupled to the lens 72 and moves the lens 72 within the confines of the sled 84. The tracking actuator 88 may be a voice coil motor.

Referring back to FIG. 2, the controller 50 controls the sled 84 and the tracking actuator 88 to position the head 68 and lens 72, respectively, with respect to a target track on the disk 66. On rough searches, the sled motor 86 is the prime mover of the lens 72. On fine searches, the tracking actuator 88 is the prime mover of the lens 72. A rough search is a long search in which the lens 72 position is changed by 2,048 tracks or more by moving the sled, while a fine search is a short search in which the lens 72 position is changed by less than 2,048 tracks using the tracking actuator 88.

A preamplifier 90 amplifies the analog RF signal output from the photo-diode 74. In this description, the output of the preamplifier 90 will be referred to as the analog RF signal.

In one embodiment, the spindle 64 supports a single disk. In an alternate embodiment, the spindle 64 supports multiple disks, and each disk is associated with a head assembly 68.

Figure 4:
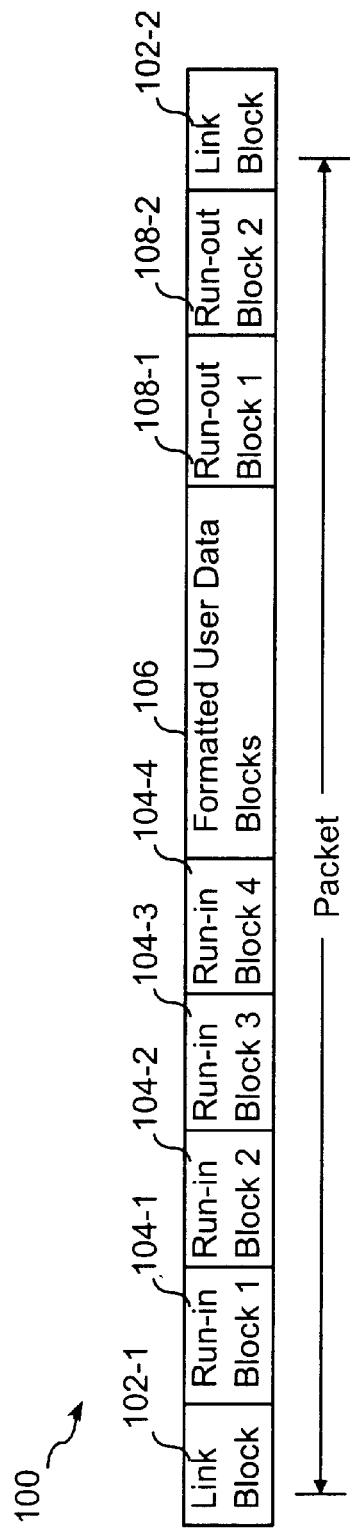
FIG. 4 illustrates an exemplary packet format including a link block.

Referring to FIG. 4, user data is stored in one or more packets 100. In a normal write operation, the power of the laser increases gradually. The CD data format provides link blocks at the beginning of a data packet 100 to allow the write power to increase gradually for a normal write operation. On a disk, a data track has at least one packet. The packet 100 includes, at least a portion of link blocks 102-1 and 102-2, four Run-in blocks 104-1, 104-2, 104-3, and 104-4, one or more formatted user data blocks 106, and two Run-out blocks 108-1 and 108-2. The link blocks 102-1 and 102-2 are physical locations on the disk where the recording of EFM signals is defined to start and stop. The link block 102-1 is a designated region of the packet 100 that is provided, in part, to allow the laser to reach a specified power level prior to writing the data. The link block 102-1 also includes link position information. In the link block 102-1, while the write power level of the laser is transitioning to the desired write power level, the laser is writing a predefined pattern of bytes.

The Run-in blocks 104-1, 104-2, 104-3 and 104-4, provide space for redundant data. The formatted user data blocks 106 include user data that has been processed into a predefined format for storage on the disk. The term "user data" refers to data received by the disk controller that is to be stored on the disk, in contrast to control information that is stored with the user data on the disk. The term "formatted user data" refers to both the user data and control information, and the formatted user data may include user data that has been processed by, at least encoding. Typically, the user data is received external to the disk controller and may be supplied by a user, application program, or file system. The Run-out blocks 108 are used for redundant data storage.

Figure 5:
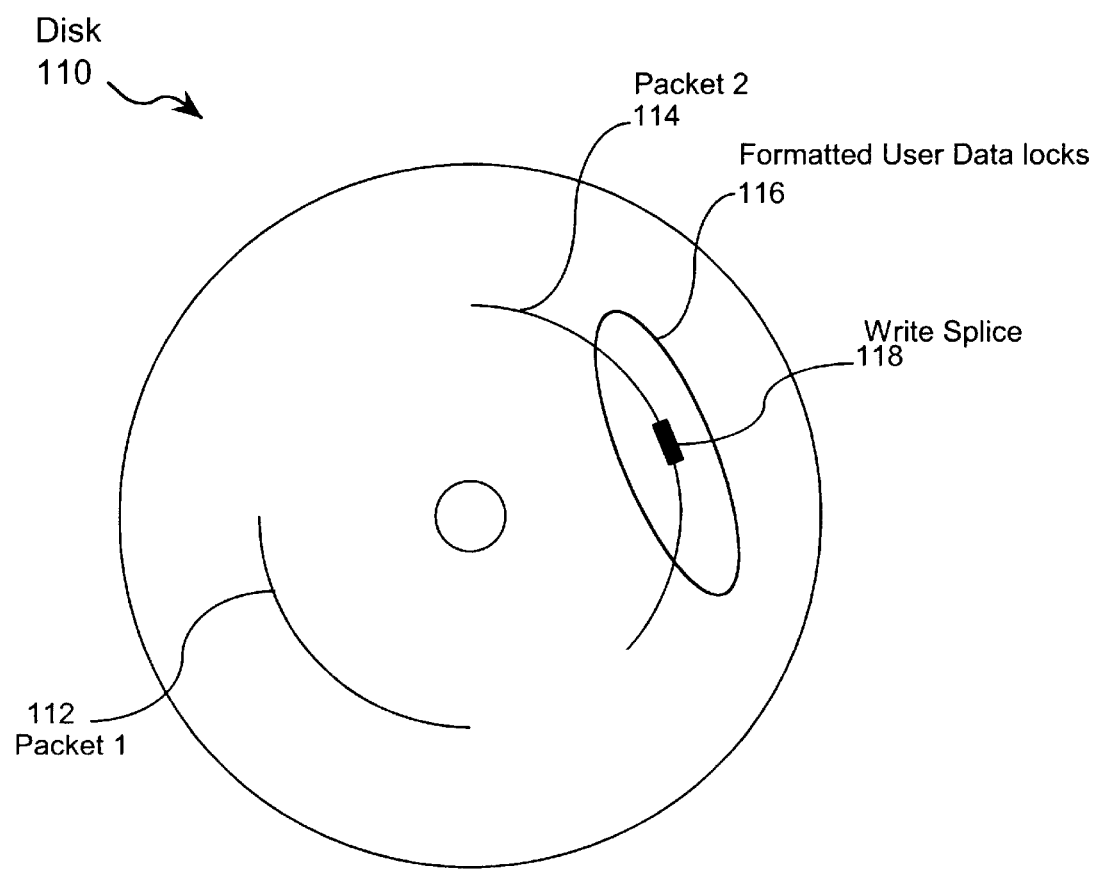
FIG. 5 illustrates a written record on a disk having a write splice produced in accordance with an embodiment of the present invention.

In FIG. 5, a disk 110 stores two exemplary packets, packet one and packet two, 112 and 114, respectively. Both packets 112 and 114 are written using the format of FIG. 4 and have a link block. Because no buffer under-run occurred, packet one 112 has been written as a single continuous data stream. In packet two 114, a buffer under-run occurred while writing one of the formatted user data blocks 116, and packet two 114 has a write splice 118.

When the write process is aborted by a buffer under-run, additional link blocks cannot be inserted to continue writing the data. In a noteworthy aspect of the present invention, packet two 114 has been written in two continuous data streams and has a "write splice" 118. Significantly, no additional link blocks have been inserted into packet two 114. The write splice 118 is an artifact that results from re-starting an aborted write process. The write splice 118 occurs at the location where the previously written data meets the newly written data. When an aborted write process is restarted, the disk controller 50 positions the head assembly 68 over a previous track, and reads the previously written data until the head assembly reaches the location where the write aborted. When reading data, the laser is operated at a read power level much less than a write power level used to write data. At the location where the write aborted, the laser begins to write data. However, the disk controller does not change its state from reading to writing instantaneously; moreover, the power level of the laser does not change to a target write power level instantaneously. The write splice 118 results from transition-related delays when changing from reading to writing data and also from the time to increase the power from the read power level to the write power level. The length of the write splice 118 is, at least in part, directly proportional to the time to change power levels from the level used for reading data to the desired write power level used for writing data. Because the write power level of the laser is changing and not stabilized in the write splice region, the write splice may contain data that is distorted in phase and amplitude with respect to the previously written data.

Figure 6:
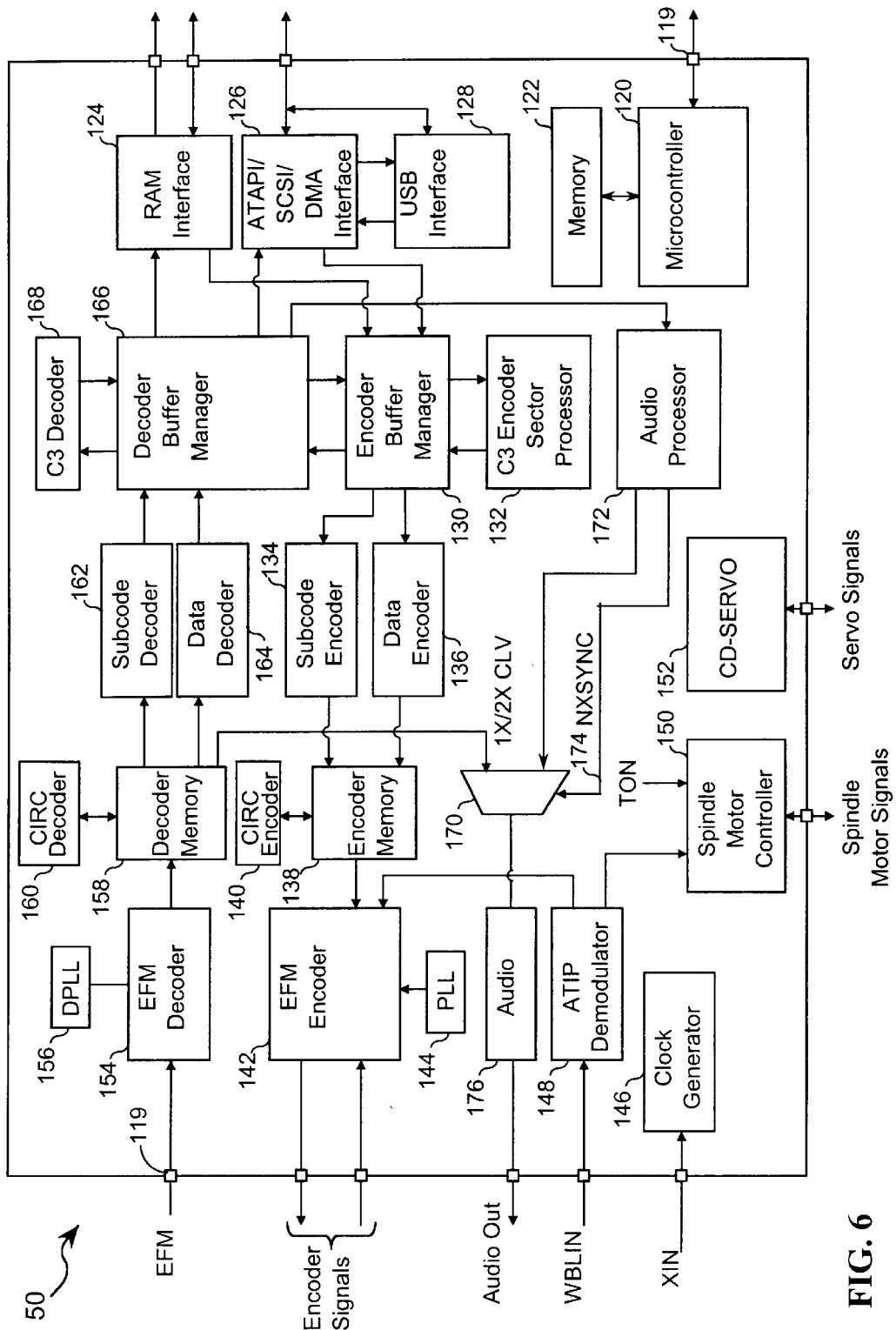
FIG. 6 illustrates a disk controller in accordance with an embodiment of the present invention.

FIG. 6 is a more detailed block diagram of the disk controller 50 of FIG. 2. A microcontroller 120 controls the operation of the disk controller 50. The disk controller 50 is implemented as an integrated circuit and each square box 119 along the edge represents one or more pins to connect to external devices.

In general, the disk controller 50 subdivides, interleaves, encodes and encapsulates user data with control information into the formatted user data blocks of the packets of FIG. 4 to be written on the optical disk. The subdividing, interleaving, encoding and encapsulation of the user data may occur many times as the data flows through a series of processing blocks before being written as EFM data on the disk. Similarly, when reading from a disk, the disk controller 50 reorganizes, deinterleaves, decodes, and removes any control information from the EFM data to extract the user data. After extracting the user data, the disk controller 50 transmits the user data.

The microcontroller 120 interfaces to a memory 122 that stores procedures and data to control the operation of the disk controller 50. The microcontroller 120 has external interfaces for communicating with one or more external devices. In accordance with commands sent to the microcontroller 120, user data may be transferred over a specified external bus via the random access memory (RAM) interface 124 or an ATAPI/SCSI/DMA interface 126. The RAM interface 124 transfers data with an external RAM. The ATAPI/SCSI/DMA interface 126 provides the well-known AT attachment packet interface (ATAPI), the well-known small computer system interface (SCSI) and a direct memory access (DMA) interface for communicating with external components and devices to the disk controller 50. A universal serial bus (USB) interface 128 connects to the ATAPI/SCSI/DMA interface 128 to provide the well-known USB interface.

When writing a data record, the RAM interface 124 or the ATAPI/SCSI/DMA interface 126 transfers data from a respective external bus to an encoder buffer manager 130.

The encoder buffer manager 130 organizes and encapsulates the data into pages having a predefined format which includes subcode information. The subcode information includes control information that is written with the user data on the disk. In particular, the subcode information includes location data that specifies the location of the data on the disk. A C3 encoder sector processor 132 interfaces to the encoder buffer manager 130 and designates the start and end pages, and the current pages being output. The encoder buffer manager 130 organizes the data into packets having the predefined format of FIG. 4.

A subcode encoder 134 generates the subcode data for the pages. A data encoder 136 encodes the non-subcode designated data as C3 encoded data. The subcode encoder 134 and the data encoder 136 output their respective encoded data such that the order of the subcode and non-subcode data in the encoder buffer manager 130 is preserved. An encoder memory 138 receives the C3 encoded subcode data and the C3 encoded data. In one embodiment, the encoder memory 138 is a four-kilobyte (4K) static random access memory (SRAM).

A CIRC encoder 140 interleaves and further encodes the C3 encoded subcode and encoded data for subsequent error detection and correction. The CIRC encoder 140 uses two Reed-Solomon Codes, called C1 and C2, to encode the data and produce C1/C2 encoded data. In mathematical terms, the C2 code is a (28, 24) Reed-Solomon Code over a Galois Field of $2^8$. After the C2 encoding has been applied, the data is interleaved and C1 encoding is applied. In mathematical terms, the C1 code is a (32, 28) Reed-Solomon Code over a Galois Field of $2^8$.

An EFM encoder 142 applies EFM encoding rules to the C1–C2 encoded data to produce signals which control the laser power to write the data to the disk. The EFM encoder 142 implements, in part, aspects of the present invention and will be discussed in further detail below with reference to FIG. 8.

Preferably, the EFM encoder operates in response to a signal from a phase-locked loop (PLL) 144. A clock generator 146 receives an externally supplied clock signal, such as from a crystal, and generates a set of clock signals which synchronize the operation of the disk controller 50.

An absolute-time-in-pre-groove (ATIP) demodulator 148 receives a wobble signal (WBLIN) from the disk drive and produces current ATIP information based on the wobble signal. The current ATIP information specifies the current location of the disk in minutes, seconds and frames. The EFM encoder 142 uses the current ATIP information to write data in a specified location on the disk.

A spindle motor controller 150 generates control signals to control the rotational velocity of the disk. The disk may be rotated at either a constant linear velocity or a constant angular velocity.

A CD-servo block 152 controls the focusing of the head with respect to a track on the disk. In the CD-servo block 152, a focus servo control system maintains the focus of the lens of the head assembly with respect to the disk. A tracking servo control system maintains the pick-up of the photodiode on the center of any track. The tracking servo control system also performs both fine and rough searches to position the lens and head assembly, respectively, with respect to a specified target track. The CD-servo block 152 also provides control signals to adjust the speed of the spindle motor.

When reading data from the disk, an EFM decoder 154 receives an EFM signal representing the pattern of data from the pits and lands of a disk. Preferably, a delayed-phase-locked-loop (DPLL) 156 synchronizes the operation of the EFM decoder 154. The EFM decoder 154 decodes the EFM data stream from the disk and supplies EFM data bytes to a decoder memory 158. In one embodiment, the decoder memory 158 is a 4K SRAM. Once in the decoder-memory 158, a CIRC decoder 160 applies C1 and C2 decoding rules to generate decoded EFM data bytes. A C1 decoder applies the inverse of the C1 encoding rules used by the C1 encoder to decode the symbols making up the EFM signal. After applying the inverse C1 encoding rules, the data is de-interleaved. Next, a C2 decoder applies the inverse of the C2 encoding rules used by the C2 encoder to decode the data from the C1 decoder. After decoding, the CIRC decoder 160 stores the decoded C1–C2 data in the decoder memory 158 and supplies the decoded C1–C2 data to a subcode decoder 162 and a data decoder 164.

A decoder buffer manager 166 receives and stores the data from the subcode decoder 162 and the data from the data decoder 164. A C3 decoder 168 decodes C3 data in accordance with prior art techniques. The decoder buffer manager 166 supplies the user data, without control and sub-code information to either the RAM interface 124 or the ATAPI/SCSI/DMA interface 126, as designated by the microcontroller 120, for output to an external bus.

When playing audio data at a 1X or 2X constant linear velocity, the decoder memory 158 supplies data to a multiplexor 170. When playing audio data at a constant linear velocity exceeding 2X, the decoder buffer manager 166 supplies that data to an audio processor 172. The audio processor 172 outputs a NXSYNC signal on line 174; the NXSYNC signal is applied to the multiplexor 170. The NXSYNC signal 174, which is based on the constant linear velocity of the disk, selects either the audio data from the decoder memory 158 or from the audio processor 172. The output of the multiplexor 170 is applied to an audio block 176, which generates an analog audio signal. The audio block 176 includes a digital-to-analog converter, which converts the digital audio data to the analog audio signal.

Because of non-linearities and temperature sensitivity inherent in the laser diodes used in the CD-R write process, the conventional method uses a closed-loop analog control system, that is, an automatic power control circuit (APC) to adjust the current which controls laser power. The laser power refers to the intensity of light output by the laser diode. To provide a stable, high quality write, the bandwidth of the APC is typically limited. If the APC loop bandwidth is too high, the output power of the laser diode will fluctuate, and the pits will be recorded inconsistently resulting in data errors during playback. When the write process is aborted by a buffer-under-run, the APC bandwidth is too low to allow the laser power to increase sufficiently rapidly to successfully restart the recording process.

Figure 7:
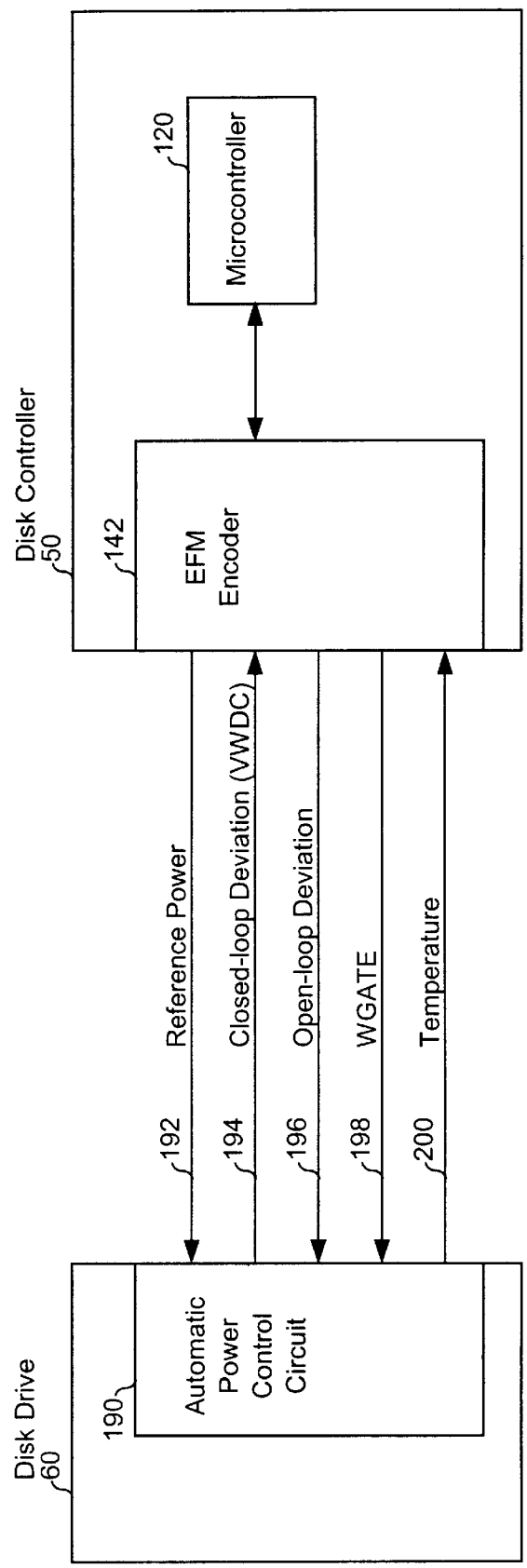
FIG. 7 illustrates a subset of signals exchanged between a disk controller and disk drive in accordance with an embodiment of the present invention.

FIG. 7 is a general block diagram of an embodiment of the present invention. In the disk drive 60, an automatic power control circuit 190 controls the amount of power output by the laser diode to write data on a disk. During a normal write operation, the automatic power control circuit 190 operates in a closed-loop mode to compensate for non-linearities and temperature sensitivity of the laser diode and thereby reduce the likelihood of data errors. When a write operation is restarted after a normal write operation has been aborted, the present invention uses open-loop control, rather than closed-loop control, to provide faster response. In contrast to closed-loop control, open-loop control is much faster and has a higher bandwidth, but may increase the instability of the automatic power control circuit. Using a closed-loop control requires approximately 10 milliseconds for the laser power to increase from a read level to a write level; an open-loop control requires only 3 to 10 nanoseconds. By using the open-loop mode while restarting a write operation that has been aborted, the disk drive can resume recording data at a location sufficiently close to the location where the write aborted to complete the write operation. To overcome the problem of reduced precision associated with open-loop control, open-loop control is only used temporarily. After restarting the write operation, the automatic power control circuit 190 gradually and smoothly changes operation from open-loop to closed-loop. Therefore, the open-loop operation of the automatic power control circuit 190 reduces the time to restore the laser power to a specified level to provide a high quality write operation temporarily, while restoring the closed-loop operation of the automatic power control circuit provides the stability needed to continue to provide a high quality write operation over the long term.

The write power refers to the intensity of the light output by the laser diode while writing data. Because of variation in the laser current to power ratio due to temperature and device-to-device differences, in a preferred embodiment, an open-loop method of power control is applied based on prior knowledge of the operating conditions and characteristics of the laser diode.

Referring to FIG. 7, in a noteworthy aspect of the present invention, additional monitor and control signals are provided between the automatic power control circuit 190 and the EFM encoder 142 to operate the automatic power control circuit 190 in both an open-loop mode and a closed-loop mode. During a normal write operation, the microprocessor 120 communicates with the EFM encoder 142 to specify a reference power value 192 which is supplied to the automatic power control circuit 190. The automatic power control circuit 190 compares the reference power value 192 to a measured power of the laser to generate a closed-loop deviation signal (VWDC) 194. The reference power value 192 is selected in accordance with an optimum write power for the disk. The optimum write power is determined in accordance with well-known power calibration methods prior to writing the user data. The power calibration methods write random data patterns at differing amounts of write power in a power calibration area of the disk, read the recorded data, measure specified characteristics of the recorded data, and select an optimum write power based on at least one of the measured characteristics. The microprocessor 120, via the EFM encoder 142, also sets an open-loop deviation signal 196 to a value that will not affect the closed-loop operation of the automatic power control circuit 190. The microprocessor 120, via the EFM encoder 142, monitors and measures the closed-loop deviation signal (VWDC).

When restarting an aborted write operation, the reference power value 192 is set to a value that effectively disables the closed-loop operation of the automatic power control circuit 190. In one embodiment, the open-loop deviation signal 196 is initially set equal to a magnitude of the closed-loop deviation signal prior to the time that the write operation is aborted. In this way, the disk controller 50 sets the amount of laser power, in open-loop mode, to substantially the same level prior to when the write operation aborted, and the automatic power control circuit 190 is operated, at least initially, in the open-loop mode. When asserted, a write gate signal WGATE 198 signals the beginning of the write operation. In an alternate embodiment, an ambient temperature 200 of the laser diode is monitored, and the microcontroller 120 adjusts the open-loop deviation signal 196 based on the temperature 200. These signals will be discussed in further detail with reference to FIGS. 8 and 9.

Figure 8:
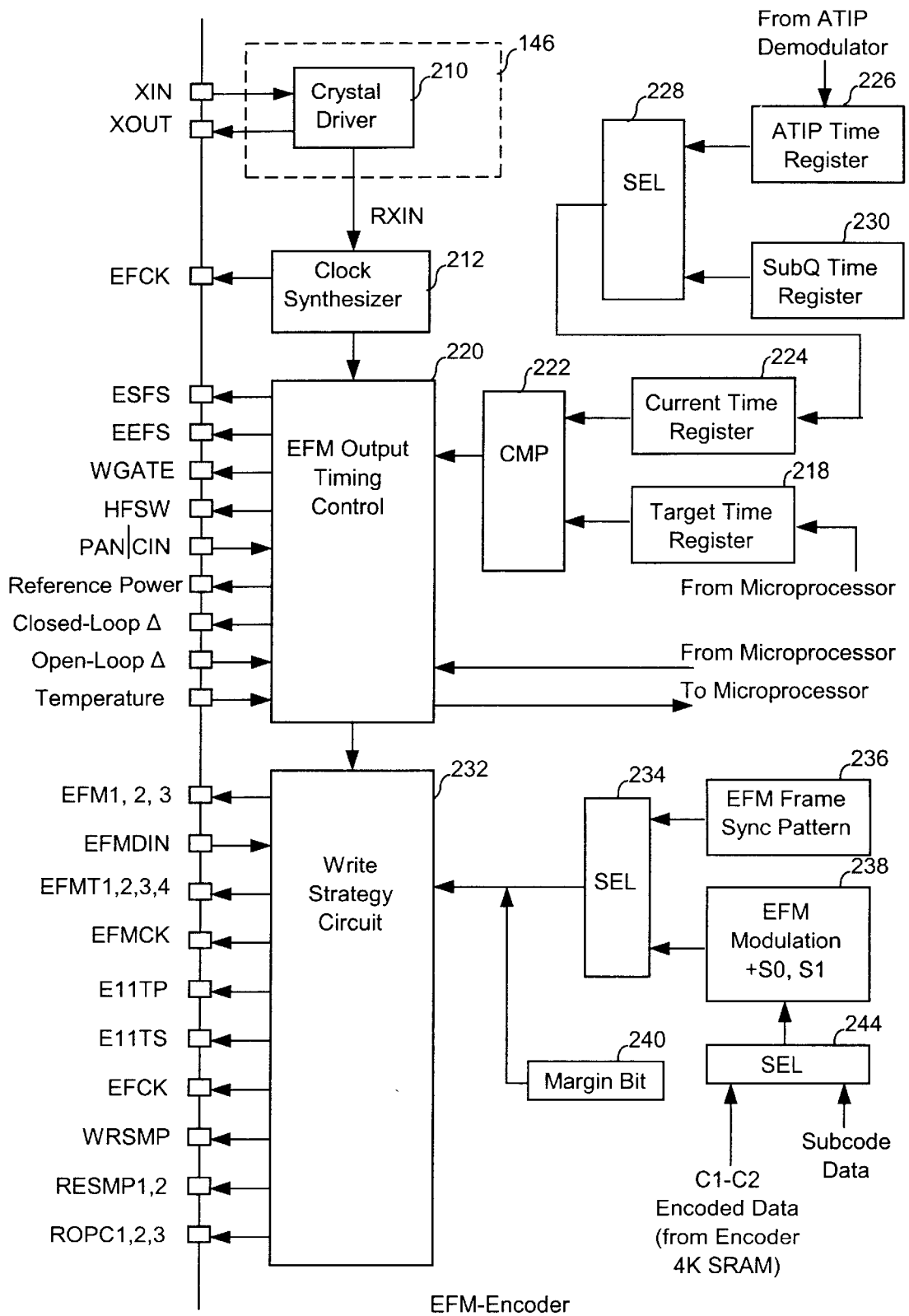
FIG. 8 illustrates a CD-encoder of the disk controller of FIGS. 6 and 7 in accordance with an embodiment of the present invention.

FIG. 8 is a more detailed block diagram of the EFM encoder 142 of FIGS. 6 and 7. In the clock generator 146, a crystal driver 210 receives an external clock signal (XIN), preferably from a crystal, and supplies that signal as a receive crystal input signal (RXIN) to a clock synthesizer 212.

The clock synthesizer 212 derives predefined clock frequencies from the receive crystal input signal, and supplies a selected one of the derived clock frequencies as an EFM clock signal, which is used to synchronize the timing of the EFM 1, 2 and 3 laser power control signals, which will be discussed further below. The selected clock frequency depends on the specified constant linear velocity of the disk. The specified constant linear velocities include the 1X, 2X, 3X, 4X, 6X, 8X and NX velocities, where 1X is a base speed and the other speeds are multiples of the 1X speed.

The microprocessor 120 (FIG. 6) specifies a location at which to start writing data by loading a target time, in minutes, seconds and frames, into the target time register 218. An EFM output timing control 220 activates the write gate signal (WGATE) to begin writing data when a comparator (CMP) 222 outputs a signal indicating that the value in a current time register 224, specified in minutes, seconds and frames, is equal to the value in the target time register 218. An ATIP time register 226 receives current ATIP information from the ATIP demodulator 148 (FIG. 6). When writing data, a selector (SEL) 228 outputs the values in the ATIP time register 226 to the current time register 224. A subcode Q (SubQ) time register 230 stores the current subcode information.

A write strategy circuit 232 responds to control signals from the EFM output timing control 220 to control the laser power to write data on the disk. A first selector circuit (SEL) 234 (e.g., a multiplexer) supplies either the EFM frame sync pattern 236 or modulated data from the EFM modulation block 238 to the write strategy circuit 232. A margin bit 240 may be selectively combined with the output of the first selector circuit 234. The second selector circuit (SEL) 244 supplies either the C1–C2 encoded data from the encoder memory or subcode data to the EFM modulation block 238.

The EFM output timing control 220 uses conventional techniques to effectuate EFM output timing. However, the conventional output timing techniques are modified to accommodate the additional signals processed in accordance with the invention, as discussed in connection with FIG. 7.

The write strategy circuit 232 generates and receives the signals shown in FIG. 8. The write strategy circuit 232 generates the EFM 1, 2 and 3 signals to control the laser power. The EFMDIN signal is an analog EFM data input signal. The EFMT1,2,3,4 signal provides pit pattern length information. The E11TP signal is an EFM 11T pit pattern indicator. The E11TS signal is an EFM 11T pit space indicator. The EFCK signal is an EFM Bit Clock. The WRSMP signal is a write level sample signal. The RESMP1,2 signal is a Read Level samples 1 and 2 indicator. The ROPC1,2,3 signal provides running optimum power control (OPC) sample and hold information.

Figure 9A:
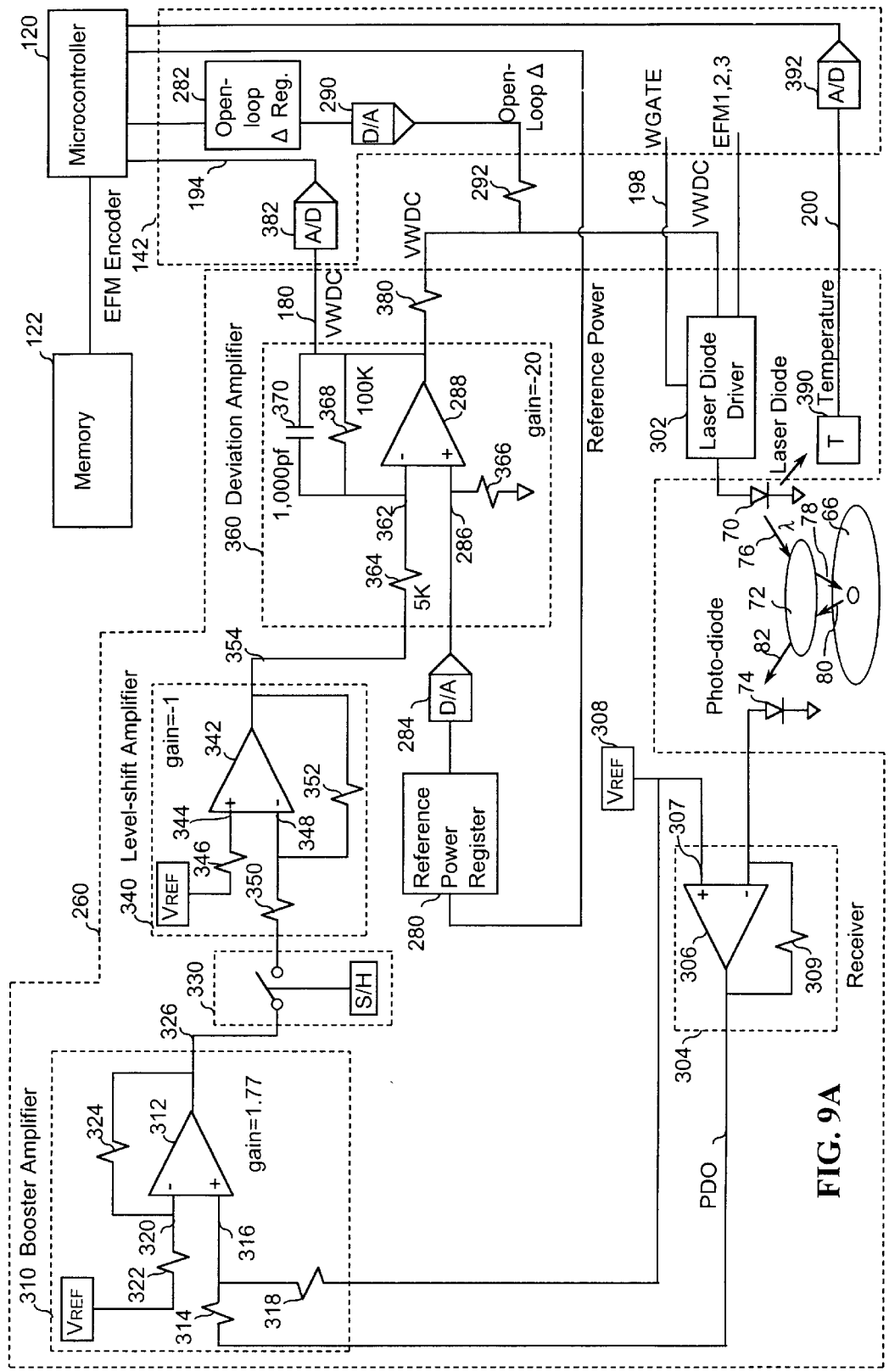
FIG. 9A illustrates a circuit for writing data on a disk in accordance with an embodiment of the present invention.

Referring now to FIG. 9A, an exemplary automatic power control circuit 260 in accordance with an embodiment of the present invention is shown. The automatic power control circuit 260 interfaces to the EFM encoder 142 and the microcontroller 120. In one embodiment, the automatic power control circuit 260 is implemented on the same circuit board as the disk controller 50 (FIG. 7). In an alternate embodiment, the automatic power control circuit 260 is implemented on a different circuit board from the circuit board on which the disk controller is mounted.

Figures 9B, 10:
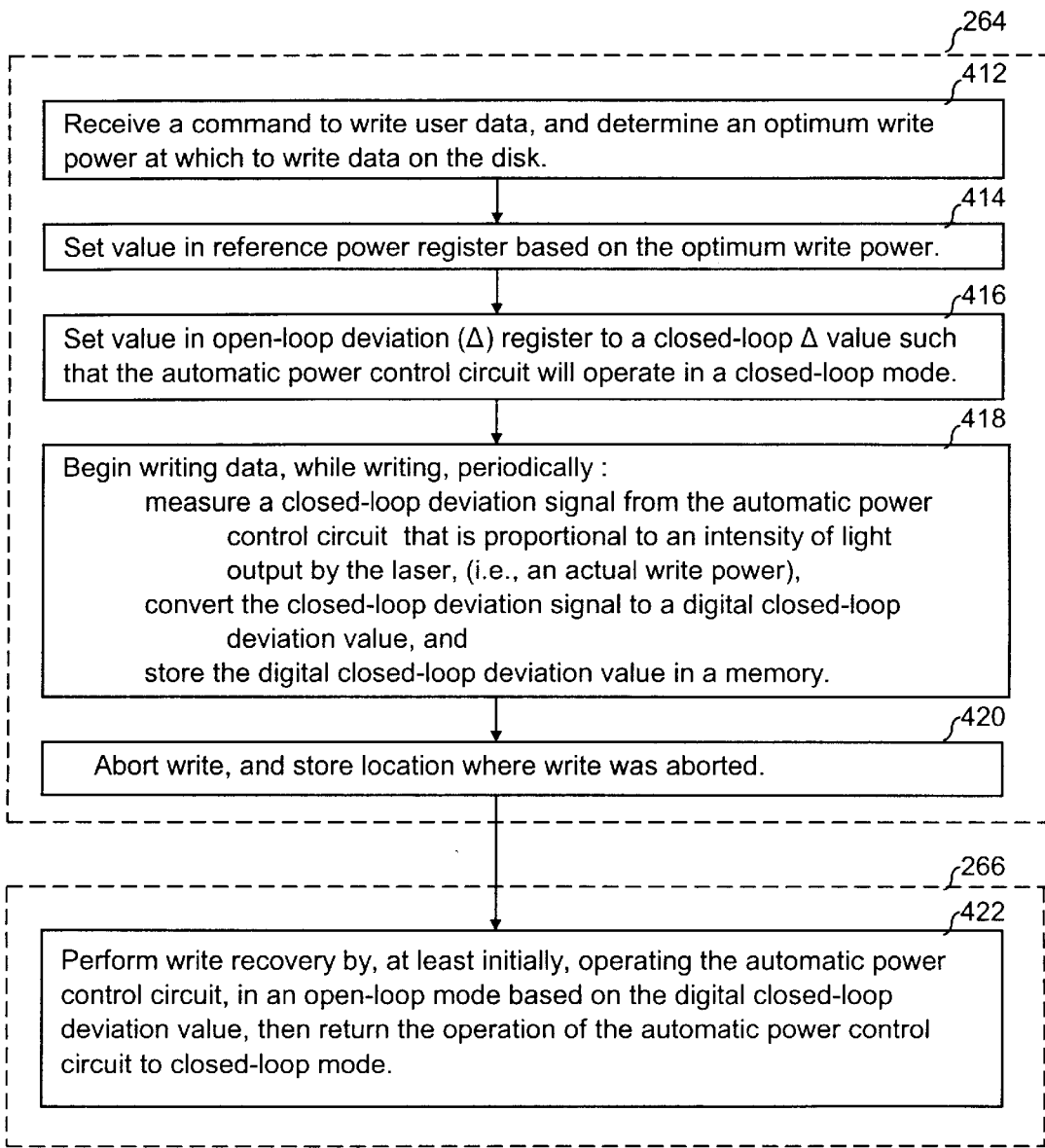
FIG. 9B illustrates procedures and data stored in the memory of the circuit of FIG. 9A.
FIG. 10 is a flowchart for performing a write operation with write recovery using the circuit of FIG. 9A.

Referring to both FIGS. 9A and 9B, the microcontroller 120 connects to the memory 122 that stores procedures and data including:

- a general operation procedure 262 that invokes other procedures to control the overall operation of the disk controller;
- a write procedure 264 to write user data to the disk;
- a write recovery procedure 266 to restart a write operation at a location where the write operation aborted in accordance with an embodiment of the present invention;
- a reference power value 268 that is supplied to the automatic power control circuit 260; during closed-loop operation, the reference power value 268 represents a target intensity of light that is output by the laser diode 70; when performing a write recovery, the write recovery procedure 266 sets the reference power value 268 to equal a predetermined value, such as zero, to disable closed-loop operation and allow the automatic power control circuit 260 to operate in an open-loop mode;
- a closed-loop deviation ($\Delta$) value 270 that is measured by the write procedure 264 when writing data to the disk; during closed-loop operation, the closed-loop deviation value 270 represents the deviation of the current intensity of the light that is output by the laser diode with respect to the target intensity of light represented by the reference power value 270;
- an open-loop deviation ($\Delta$) value 272 that is output by the write recovery procedure 266;
- a digital temperature value 274 that, in an alternate embodiment that will be described below, is measured by the write procedure 264 either before writing data or during writing data; in an alternate embodiment, the write recovery procedure 266 adjusts the open-loop deviation ($\Delta$) value 272 based on the digital temperature value 274;
- a laser-power adjustment table 276 that provides a laser power adjustment value based on the temperature of the laser; in another alternate embodiment, the write recovery procedure 266 applies the laser power adjustment value 276 to the closed-loop deviation ($\Delta$) value 270 to provide the open-loop deviation ($\Delta$) value 272; and
- a laser-power adjustment factor 278 that, in an alternate embodiment, the write recovery procedure 266 applies to the closed-loop deviation ($\Delta$) value 272 to provide the open-loop deviation ($\Delta$) value 270 to the automatic power control circuit 260.

The microcontroller 120 executes the general operation procedure 262. When the general operation procedure 262 receives a command to write user data to the disk, the general operation procedure 262 invokes the write procedure 264 to write the user data. When the write procedure 264 terminates abnormally, such as from a buffer under-run, the microcontroller 120 invokes the write_recovery procedure 266 to complete the write operation starting at the location where the write terminated.

During the write procedure 264, prior to writing data, the microcontroller 120 configures the automatic power control circuit 260 for closed-loop operation. To enable closed-loop operation, the microcontroller 120 loads a predetermined reference power value 268 into a reference power register 280. The microcontroller 120 also loads another predetermined deviation (Δ) value 272 into an open-loop deviation (Δ) register 282 such that the open-loop operation of the automatic power control circuit will not be affected.

A reference-power-digital-to-analog (D/A) converter 284 converts the reference power value in the reference power register 280 to an analog reference power signal, which is supplied to the positive input 286 of a deviation differential amplifier 288. The reference power value is identified when determining the optimum write power. As stated above, during closed-loop operation, the closed-loop deviation value 270 represents the deviation of the current intensity of the light that is output by the laser diode with respect to the target intensity of light represented by the reference power value 268. In one embodiment, the target intensity of light is the optimum write power.

An open-loop deviation digital-to-analog converter 290 converts the open-loop deviation value in the open-loop deviation register 282 to an analog open-loop deviation signal. When the open-loop deviation value is equal to zero, the open-loop deviation digital-to-analog converter 290 outputs a value substantially equal to ground. The resistance of the open-loop deviation resistor 292 is selected such that substantially no current flows from the VWDC node through the open-loop deviation resistor 292 when the open-loop deviation value is equal to zero. Therefore, the operation of the automatic power control circuit 260 is not affected when the open-loop deviation value is equal to zero.

During a normal write operation, after the values in the reference power register 280 and the open-loop deviation register 282 are set, when the current ATIP time is equal to a specified target ATIP time, user data is written in accordance with the format of FIG. 4. In the link block area 102-1 (FIG. 4), as the power of the laser is increased to a specified write power, a warm-up data pattern is written for a predetermined time to allow the laser to reach a stable laser power and temperature, and therefore avoid undesirable transient effects in the data. After the warm-up data pattern is written, the user data is written in a predefined format that specifies synchronization signals and control information.

A laser diode driver 302 supplies current to drive the laser diode 70 when the write gate signal (WGATE) is asserted in accordance with the EFM 1, 2 and 3 signals from the write strategy circuit 232 (FIG. 8). The laser diode 70 generates heat as data is written, and the change in temperature affects the intensity of light output by the laser diode 70. To compensate for the thermal characteristics of the laser diode 70, a driver-deviation signal is also supplied to the laser diode driver 302 to decrease or increase the laser power as the intensity of light from the laser diode 70 increases or decreases, respectively, during a write operation. During closed-loop operation, the closed-loop deviation signal 270 from the deviation amplifier 360 is supplied to the laser-diode driver 302 as the deviation signal.

During a write operation, the laser diode driver 302 supplies a drive current to the laser diode 70 causing the laser diode 70 to emit light 76 in accordance with the EFM1, 2 and 3 signals. The light is focused by the lens 72 onto the disk surface 66 as shown by arrow 78. The light 80 reflects off the disk surface 66, and passes through the lens 72 as indicated by arrow 82. The photo-diode 74 senses the reflected light 82 and outputs a sensed-light voltage directly proportional to the intensity of the sensed reflected light 82.

A receiver 304, including a receiver-differential amplifier 306, amplifies the sensed-light voltage to provide a signal that is proportional to the sensed-light voltage called photo-diode output (PDO). A positive input 307 of the receiver-differential amplifier 306 is connected to a Vref reference voltage 308. A receiver-resistor 309 provides negative feedback for the receiver 304.

A booster amplifier 310, including a booster-differential amplifier 312, amplifies the PDO signal to produce an amplified PDO signal. The booster amplifier 310 receives the PDO signal via a first-booster resistor 314 at a positive input 316. The positive input 316 is also coupled to the Vref reference voltage 308 via a second-booster resistor 318. A negative input 320 of the booster-differential amplifier 312 is connected to the Vref reference voltage 308 via a third-booster resistor 322. A fourth resistor 324 provides a negative feedback loop between the output of the booster-differential amplifier 312 and the negative input 320 of the booster-differential amplifier 312. In one embodiment of the invention, the values of the first-booster, second-booster, third-booster and fourth-booster resistors, 314, 318, 322, and 324, respectively, are selected such that the booster amplifier 310 has a gain approximately equal to 1.77.

The amplified PDO signal is periodically sampled by a sample and hold circuit 330 to provide a sampled PDO signal. A level-shift amplifier 340 adjusts the voltage level of the sampled PDO signal to produce a level-shifted PDO signal. The level-shift amplifier 340 is implemented using a differential amplifier 342, referred to as a level-shift differential amplifier 342. A positive input 344 of the level-shift differential amplifier 342 is connected to the Vref reference voltage 308 via a first level-shift resistor 346. The sampled PDO signal is supplied to a negative input 348 of the level-shift differential amplifier 342 via a second level-shift-amplifier resistor 350. A third level-shift-amplifier resistor 352 provides negative feedback between the output of the level-shift differential amplifier 342 and the negative input 348 of the level-shift differential amplifier 342. In one embodiment of the invention, the values of the first level-shift-amplifier resistor 346, the second level-shift-amplifier resistor 350 and the third level-shift-amplifier resistor 352 are selected to provide a gain of approximately "−1" for the level-shift amplifier 340.

The deviation amplifier 360, including a deviation differential amplifier 288, produces the closed-loop deviation (Δ) signal called VWDC, described above. The closed-loop deviation (Δ) signal represents a filtered difference between the intensity of light produced by the laser diode 70 and a target light intensity as specified by the reference power value. The term "filtered difference" is used because the closed-loop deviation signal is a function of the characteristics of the receiver 304, the booster amplifier 310, the level-shift amplifier 340, and the deviation amplifier 288. Preferably, the characteristics, including the gain, of this series of amplifiers are adjusted to provide a stable closed-loop feedback loop and therefore act like a filter. The deviation differential amplifier 288 receives the level-shifted PDO signal at a negative input 362 via a first deviation amplifier resistor 364. The deviation differential amplifier 288 receives a predetermined laser power reference voltage from the reference power digital-to-analog converter 284 at its positive input 286. A second deviation amplifier resistor 366 is connected between the positive input 286 of the deviation differential amplifier 288 and ground. A third deviation amplifier resistor 368 and a capacitor 370, connected in parallel, provide negative feedback from the output of the deviation differential amplifier 288 and its negative input 362.

In one implementation, the first deviation amplifier resistor 364 has a resistance equal to approximately five thousand (K) ohms (Ω), the third deviation amplifier resistor 368 has a resistance equal to approximately 100 KΩ, the capacitor 370 has capacitance approximately equal to 1,000 picofarads (pf), and the deviation amplifier 288 has a gain of approximately —20.

A laser diode driver resistor 380 converts the closed-loop deviation signal (VWDC) signal from a voltage output by the deviation amplifier 360 to a VWDC current that is supplied to the laser diode driver 302.

During a write operation, the microcontroller 120 samples a digital closed-loop deviation (Δ) value representing the analog closed-loop deviation (VWDC) signal output by the deviation amplifier 360 via the closed-loop deviation signal (VWDC) analog-to-digital converter 382. The microcontroller 120 stores the digital closed-loop deviation (Δ) value 270 in the memory 122 for use in write recovery, if needed. The sampling of the closed-loop deviation (VWDC) signal will be further described below with reference to FIGS. 10 and 12.

In an alternate embodiment, to further compensate for variations in the intensity of light output by the laser diode 70 from thermal effects, a thermistor 390 is placed sufficiently close to the laser diode 70 to measure the ambient temperature surrounding the laser diode 70. The output of the thermistor 390 is supplied to a temperature analog-to-digital converter 392, which outputs a digital temperature value. The microcontroller 120 reads the digital temperature value, as will be further described below with reference to FIG. 12, and stores the digital temperature value 274 in the memory 122.

During closed-loop operation, the overall loop gain of the automatic power control circuit 260 is represented in accordance with relationship (1) as follows:

$$G = \left(\left(\frac{20}{(0.099e^{-3j\omega}+1)}\right) * \left(\frac{94}{2900}\right) * 0.5 * 50\right) \quad (1)$$

The forward gain is represented in accordance with relationship (2) as follows:

$$Gf = \frac{(28.7)}{(0.099e^{-3j\omega}+1)} \quad (2)$$

The zero-crossing bandwidth is approximately equal to 44.5 Kilohertz (KHz), and the direct current (DC) gain is equal to approximately 29.1 decibels (db).

Operating the automatic power control circuit in closed-loop mode provides a response time ranging from 50 microseconds to about 2 milliseconds.

In an alternate embodiment, using a 0.022 microfarad (μf) capacitor 370, and a third deviation resistor 368 having a value of 1 MegaOhm (MΩ), the forward gain is represented in accordance with relationship (3) as follows:

$$Gf = \frac{(287)}{(0.022j\omega+1)}. \quad (3)$$

The zero-crossing bandwidth is equal to approximately 2.07 KHz, and the DC gain is equal to approximately 49 db.

Referring now to FIG. 10, a flowchart illustrates the write procedure 264 and the write recovery procedure 266 of FIG. 9B executed by the microcontroller 120 (FIG. 9A). In FIG. 10, the write procedure includes steps 412 to 420, and the write recovery procedure 266 includes step 422.

In step 412, the write procedure 264 receives a command to write data to a disk and performs the well-known power calibration operation to determine the optimum write power at which to drive the laser to write data to the disk. In step 414, the write procedure 264 sets a value in the reference power register 280 (FIG. 9A) to a first reference power value 268 based on the optimum write power.

In step 416, the write procedure 264 sets a value in the open-loop deviation (Δ) register 282 to equal a closed-loop deviation (Δ) value 270 that causes the automatic power control circuit to operate in closed-loop mode, as described above. In one embodiment, the write procedure 264 loads a value of zero into the reference power register 280.

In step 418, the write procedure 264 begins to write the user data at the target location. While writing data, the write procedure 264 periodically measures the closed-loop deviation (VWDC) signal from the automatic power control circuit. The closed-loop deviation (VWDC) signal is proportional to an intensity of light output by the laser, that is, the actual write power. The deviation amplifier 360 generates the closed-loop deviation (VWDC) signal, and the closed-loop deviation analog-to-digital converter 382 converts the closed-loop deviation (VWDC) signal to the digital closed-loop deviation (Δ) value 270. The write procedure 264 stores the digital closed-loop deviation (Δ) value 270 in the memory 122 (FIG. 9B).

In step 420, the write is aborted by, for example, a buffer underrun. In this example, a first portion of the packet was written on the disk, and a second portion of the packet needs to be written on the disk. The write procedure 264 stores the location where the write aborted. In one embodiment, the write procedure 264 maintains a count of a number of bytes in the packet that were correctly written to the disk prior to the aborted write operation.

In step 422, to recover from the aborted write and to write the second portion of the data, the write recovery procedure 266, at least initially, operates the automatic power control circuit in an open-loop mode based on the closed-loop deviation (Δ) value 270 stored in the memory 122 (FIG. 9B) by the write procedure 264. The write recovery procedure 266 then returns the operation of the automatic power control circuit to closed-loop mode.

In an alternate embodiment, step 418 periodically measures the closed-loop deviation (VWDC) signal at predetermined time intervals. In another alternate embodiment, step 418 periodically measures the closed-loop deviation (VWDC) signal at random intervals. In yet another alternate embodiment, step 418 periodically measures the closed-loop deviation (VWDC) signal after a predetermined number of bytes have been written. In another embodiment, step 418 periodically measures the closed-loop deviation (VWDC) signal after a random number of bytes have been written. In yet another embodiment, step 418 measures the closed-loop deviation (VWDC) signal only once while writing data. Alternately, step 418 measures the closed-loop deviation (VWDC) signal only once when starting to write data.

Figures 11A, 11B:
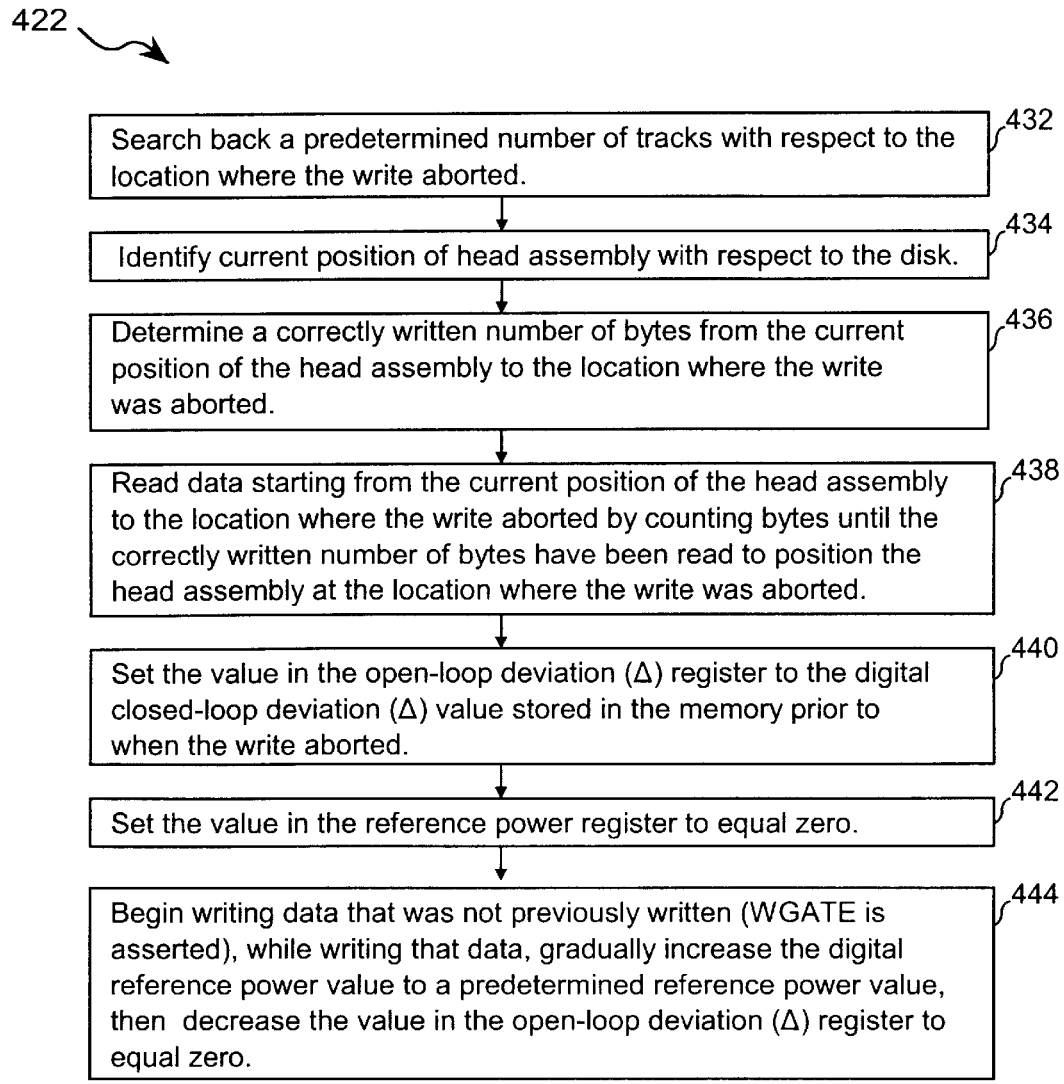
FIG. 11A is a flowchart for performing the write recovery of FIG. 10 in accordance with an embodiment of the present invention.
FIG. 11B is a flowchart of an alternate embodiment of step 444 of FIG. 11A.

FIG. 11A is a flowchart of step 422 of FIG. 10 for performing write recovery in accordance with an embodiment of the present invention. In step 432, the write recovery procedure 266 searches back a predetermined number of tracks prior to the location where the write aborted. In one implementation, the predetermined number of tracks is equal to one. In step 434, the write recovery procedure 266, based on the ATIP information, identifies the current position of the head assembly with respect to the disk. In step 436, the write recovery procedure 266 determines the number of bytes that were correctly written with respect to the current position of the head assembly and the location where the write aborted. In step 438, the write recovery procedure 266 reads data starting from the current position of the head assembly to the location where the write was aborted. The write recovery procedure 266 counts the number of bytes read until the number of bytes that were correctly written have been read. In this way, the disk controller identifies the location where the write aborted, and the head assembly is positioned at that location to continue to write data.

In step 440, the write recovery procedure 266 sets the value in the open-loop deviation (Δ) register 282 (FIG. 9A) to the closed-loop deviation (Δ) value 272 that was stored during the write process prior to when the write aborted. In step 442, the write recovery procedure 266 sets the value in the reference power register 280 (FIG. 9A) to zero to effectively configure the automatic power control circuit for open-loop operation in response to the value in the open-loop deviation (Δ) register 282 (FIG. 9A). In step 444, the disk controller asserts write gate (WGATE) and begins writing the second portion of data; in other words, the disk controller writes the data that was not previously written. While writing that data, to restore closed-loop operation, the write recovery procedure 266 gradually increases the digital reference power to a predetermined reference power value 268, then decreases the value in the open-loop deviation (Δ) register 282 (FIG. 9A) to zero, so as not to impact closed-loop operation.

Referring to FIG. 11B, in an alternate embodiment of step 444 of FIG. 11A, in step 446, while writing data, to restore closed-loop operation, the write recovery procedure gradually increases the digital reference power to a predetermined reference power value, while simultaneously decreasing the value in the open-loop deviation (Δ) register 282 to zero.

Figure 12:
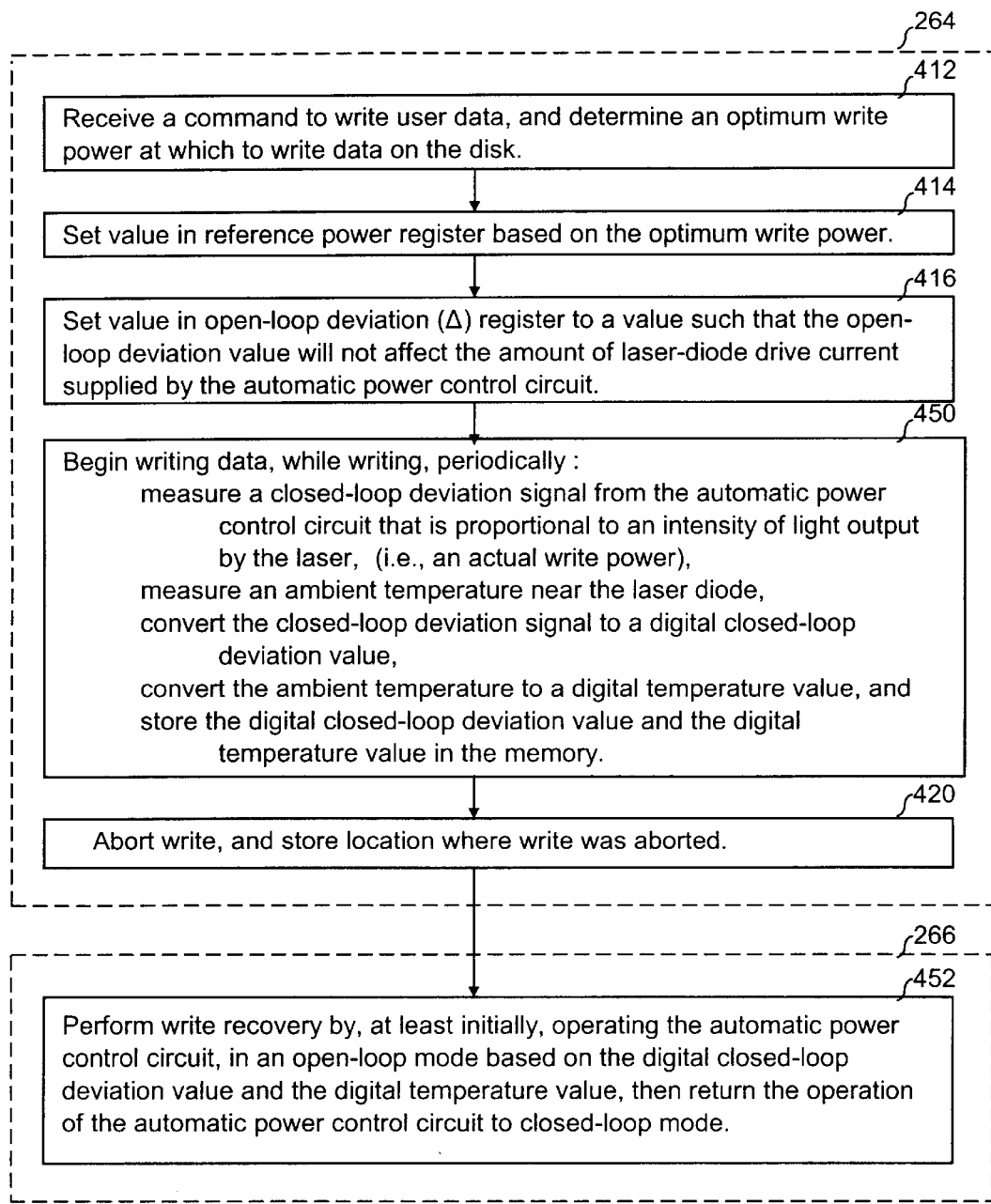
FIG. 12 is a flowchart for performing a write operation with write recovery in accordance with an alternate embodiment of the present invention.

In FIG. 12, a flowchart of an alternate embodiment of a write operation with write recovery is shown that also measures the temperature of the laser diode and, during the recovery process, generates the open-loop deviation (Δ) value by adjusting the closed-loop deviation (Δ) value based on the temperature of the laser diode. In this way, when starting to write the second portion of data during open-loop mode, the power of the laser diode more rapidly approaches the power just prior to when the write aborted. FIG. 12 is similar to FIG. 10; therefore, only the differences will be described. Steps 412, 414 and 416 of FIG. 12 are same as in FIG. 10. In step 450, periodically, while writing data: the closed-loop deviation (VWDC) signal from the automatic power control circuit is measured. The closed-loop deviation analog-to-digital converter 382 converts the closed-loop deviation (VWDC) signal to a closed-loop deviation (Δ) value. An ambient temperature near the laser diode is also sensed by a thermistor. A temperature analog-to-digital converter 392 converts the measured temperature to a digital temperature value 274. The write procedure 264 stores the closed-loop deviation (Δ) value 270 and the digital temperature value 274 in memory. In step 420, described above, the write operation aborts, and the write procedure 264 stores the location where the write was aborted in memory.

In step 452, the write recovery procedure 266, at least initially, operates the automatic power control circuit in an open-loop mode based on the digital closed-loop deviation (Δ) value 270 and the digital temperature value 274, then returns the operation of the automatic power control circuit to closed-loop mode.

In an alternate embodiment of step 450, the closed-loop deviation (VWDC) signal and the temperature are measured once after a predetermined number of data bytes are written. In another alternate embodiment, the closed-loop deviation (VWDC) signal and the temperature are measured periodically as described above with reference to FIG. 10.

Figure 13:
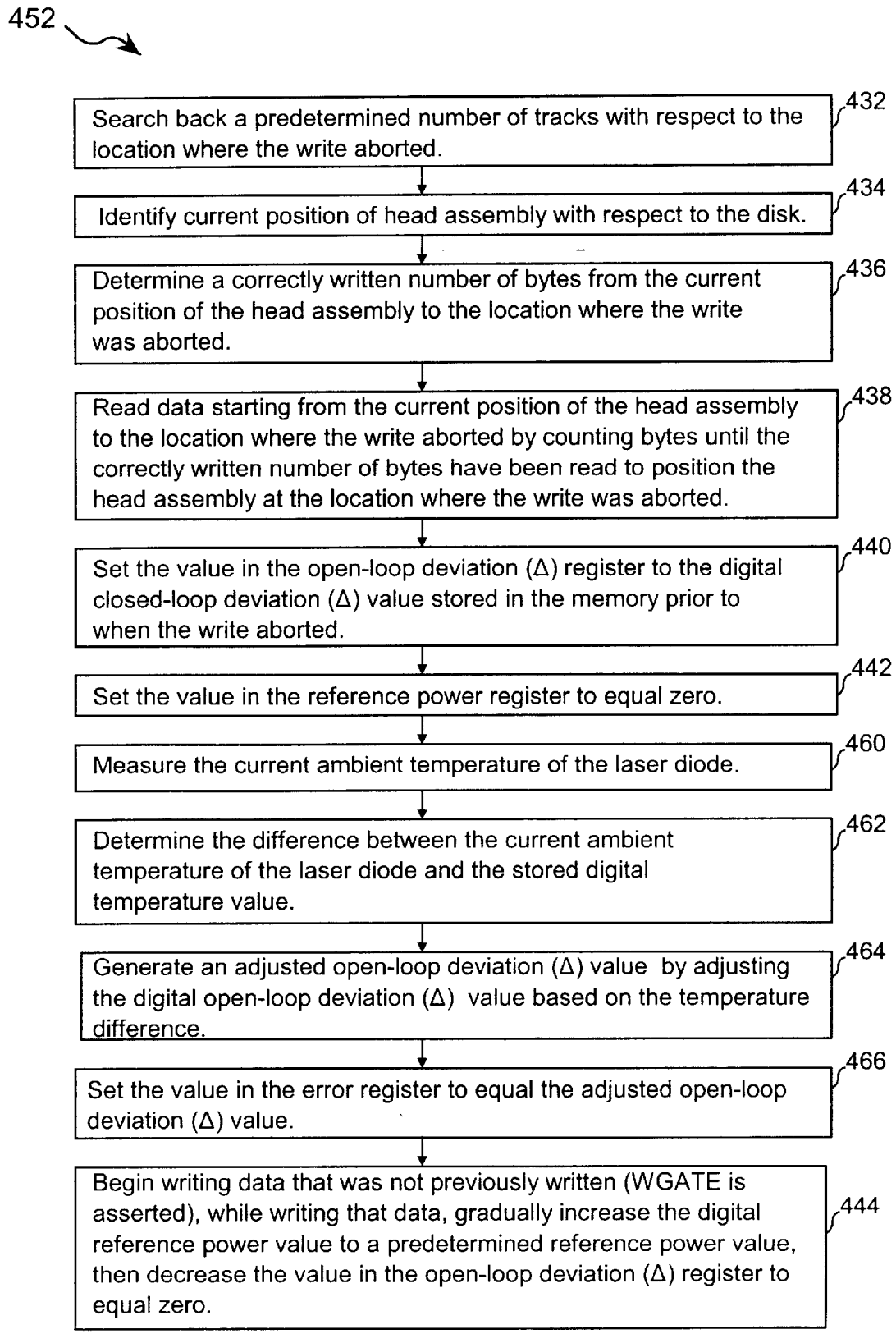
FIG. 13 is a flowchart for performing the write recovery of FIG. 12.

FIG. 13 is a flowchart of step 452 of FIG. 12 that performs the write recovery. FIG. 13 is similar to FIG. 11A; therefore, only the differences will be described. Steps 432–442 are the same as in FIG. 12. In step 460, the write recovery procedure measures the current ambient temperature of the laser diode. In step 462, the write recovery procedure determines the difference between the current ambient temperature of the laser diode and the stored digital temperature value 274. In step 464, the write recovery procedure generates an adjusted digital open-loop deviation (Δ) value 272 by adjusting the digital closed-loop deviation (Δ) value 270 based on the temperature difference. In one embodiment, the digital closed-loop deviation (Δ) value 270 is multiplied by the laser-power adjustment factor 278 (FIG. 9B) and the temperature difference. In an alternate embodiment, the write recovery procedure searches the laser power adjustment table 276 (FIG. 9B), and selects a digital open-loop deviation (Δ) value 272 that corresponds to the current temperature and produces the same write power as the stored digital temperature value 274. In another alternate embodiment, the write recovery procedure implements a predefined equation, provided by the manufacturer of the laser diode, which is applied to the temperature difference and measured write power to generate the adjusted write power.

In step 466, the write recovery procedure sets the value in the open-loop deviation register 282 to equal the adjusted digital open-loop deviation (Δ) value 272. Step 444 is the same as FIG. 11A, and in an alternate embodiment, is the same as FIG. 11B, and will not be described.

Figure 14:
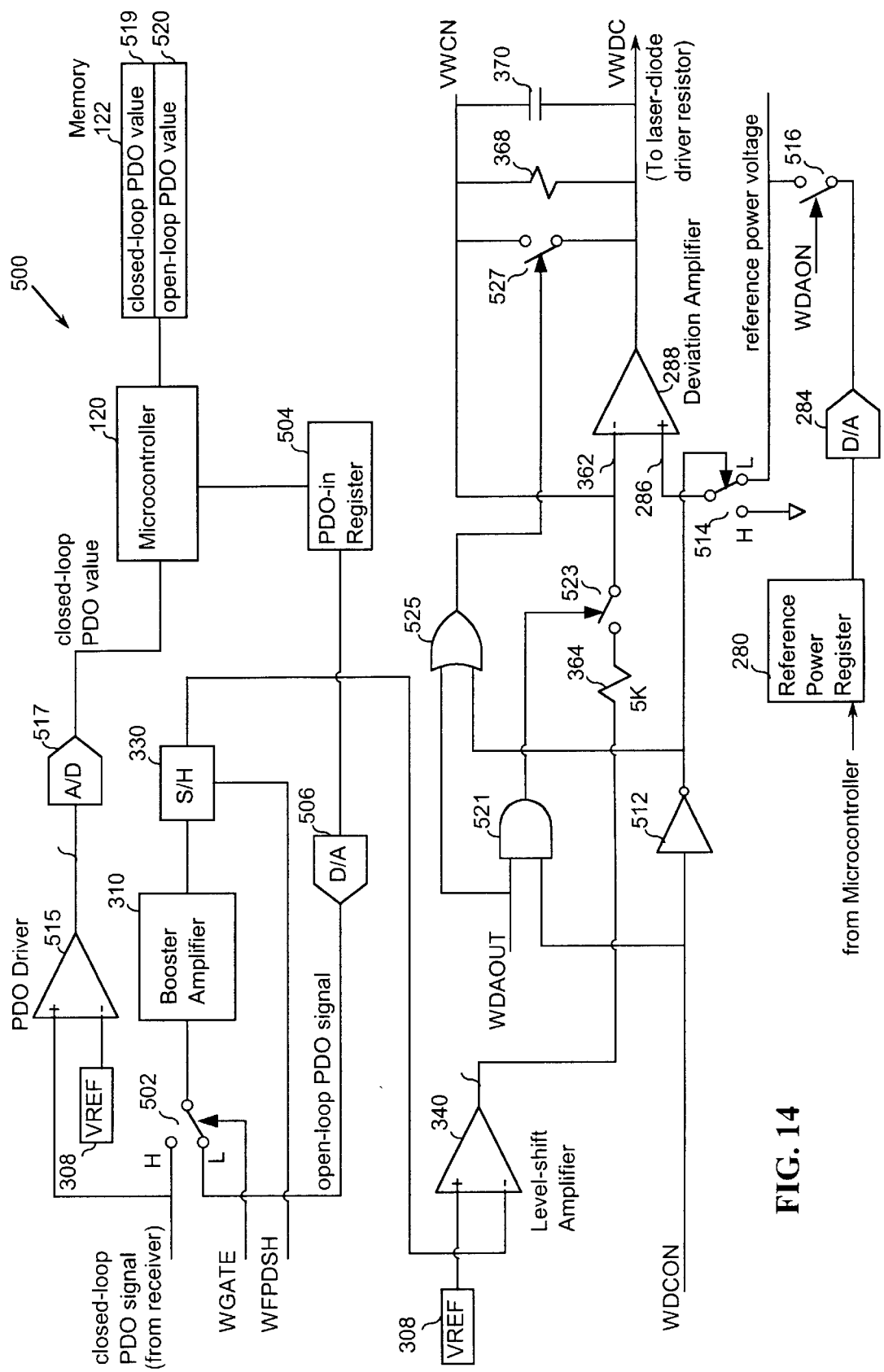
FIG. 14 illustrates a circuit diagram of a power control circuit in accordance with the alternate embodiment of the invention.

FIG. 14 is a circuit diagram illustrating an alternate embodiment 500 of the invention. In this alternate embodiment 500, open-loop operation is achieved by adjusting both the reference power and the PDO signal that is supplied to the booster amplifier 310. This alternate embodiment 500 includes a switch 502 that switches between the closed-loop PDO signal that is output from the receiver 304 (FIG. 9A) and the open-loop PDO signal that is set by the microcontroller 120 via an PDO register 504 and an PDO digital-to-analog converter 506.

The closed-loop PDO signal is provided as described above with reference to FIG. 9A. An PDO drive amplifier 515 amplifies the closed-loop PDO signal to provide an amplified closed-loop PDO signal. A PDO analog-to-digital converter 517 converts the amplified closed-loop PDO signal to a digital closed-loop PDO value. The microcontroller 120 reads the closed-loop PDO value and stores the closed-loop PDO value 519 in the memory 122. In one embodiment, the digital closed-loop PDO value is determined while performing the optimum power calibration. Alternately, the digital closed-loop PDO value is determined for a specified laser power from data provided by the manufacturer of the optical head.

In this embodiment, when the write gate signal (WGATE) is not asserted, the switch 502 supplies the open-loop PDO signal to the booster amplifier 310. When the write gate signal is asserted, the switch 502 supplies the closed-loop PDO signal to the booster amplifier 310. Therefore this embodiment operates in open-loop mode prior to writing data, and returns to closed-loop mode when data is to be written on the disk.

Prior to writing data, the EFM encoder 142 (FIG. 9A) asserts a write data control (WDCON) signal. When asserted, the write data control signal is inverted by an inverter 512 and controls a switch 514. When the write data control signal is asserted, the switch 514 supplies a reference power voltage to the positive input 286 of the deviation amplifier 288, rather than ground. Prior to asserting the write data control signal, a write data on (WDAON) signal is asserted to cause a switch 516 to supply the reference power voltage from the reference power register 280 and the reference power digital-to-analog converter 284 to the switch 514.

When both the write data control signal (WDCON) and a write data out signal (WDAOUT) are asserted, AND gate 521 outputs a digital high signal which causes switch 523 to close and supply the level-shifted PDO signal output by the level shift amplifier 340 to the negative input 362 of the deviation amplifier 288.

When the write data out signal (WDAOUT) is asserted or when the write data control signal is asserted, NOR gate 525 outputs a digital high signal which causes switch 527 to open and allow the resistor 368 and capacitor 370 to provide feedback to the deviation amplifier 288.

Once the write gate is asserted, the EFM encoder 142 (FIG. 9A) supplies a write-sample-and-hold signal (WFPDSH) to the sample-and-hold circuit (S/H) 330 to control the timing of the sampled PDO signal. The EFM encoder 142 (FIG. 9A) also supplies the EFM 1, 2 and 3 pulses to the laser diode driver to control the laser-power. The EFM encoder 142 (FIG. 9A) synchronizes the timing between write-sample-and-hold signal and the EFM 1, 2 and 3 pulses to sample the PDO signal resulting from the EFM 1, 2 and 3 pulses at a specified time.

Figure 15:
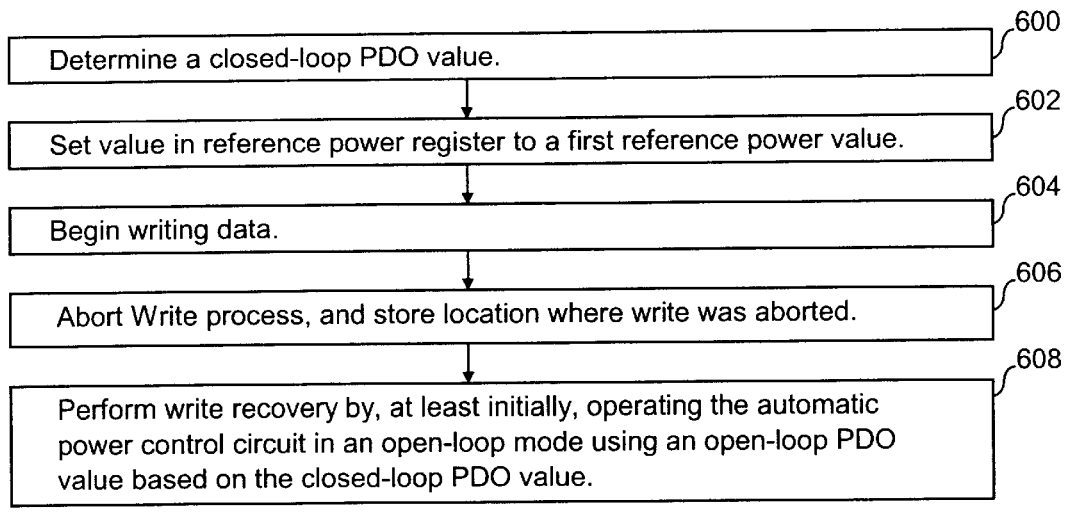
FIG. 15 is a flowchart for performing a write operation with write recovery using the circuit of FIG. 14.

In FIG. 15, a flowchart of a write procedure and write recovery procedure using the circuit of FIG. 14 is shown. The write procedure includes steps 600–606 and the write recovery procedure includes step 608.

In step 600, the write procedure determines a closed-loop PDO value. In one embodiment, the closed-loop PDO value is determined during the optimum power calibration procedure, and is in accordance with a selected optimum write power.

In an alternate embodiment, the closed-loop PDO value is determined in accordance with "the needed laser power output."

In step 602, the write procedure sets the value in the reference power register to a reference power value based on the optimum write power as described above with reference to step 414 of FIG. 10. In step 604, the write procedure begins to write data. In step 606, the write is aborted, and the location where the write aborted is stored as described above with reference to step 420 of FIG. 10.

In step 608, the write recovery procedure performs a write recovery by writing the remaining data starting from the location where the write aborted by operating the automatic power control circuit in an open-loop mode, at least initially, using an open-loop PDO value that is based on the closed-loop PDO value. In one embodiment, the open-loop PDO value is equal to the closed-loop PDO value. In an alternate embodiment, the ambient temperature of the laser diode is measured and stored as described above with reference to FIG. 13, and the closed-loop PDO value is adjusted based on a current ambient temperature of the laser diode and the ambient temperature of the laser diode when the closed-loop PDO value was measured.

Figure 16:
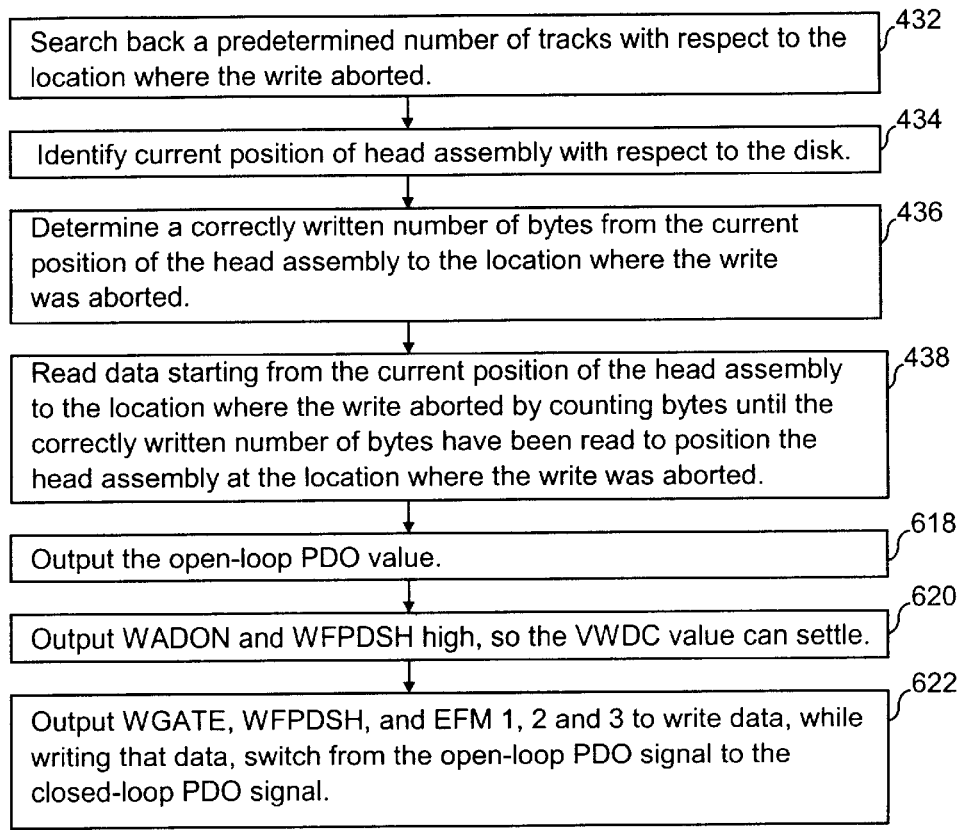
FIG. 16 is a flowchart of a write recovery operation performed in accordance with an embodiment of the invention.

FIG. 16 is a more detailed flowchart of the write recovery procedure of step 608 of FIG. 15. Steps 432–348 are the same as in FIG. 11A. After positioning the head assembly at the location where the write aborted, in step 618, the write recovery procedure outputs the open-loop PDO value. In step 620, the write recovery procedure outputs the write data on (WDAON) as a digital high value, and the write sample and hold signal as a digital high value so that the deviation signal from the deviation amplifier (VWDC) can settle. In step 622, the EFM encoder asserts the write gate (WGATE) signal, the write data sample and hold (WFPDSH) pulses, and outputs the EFM 1, 2, and 3 pulses to write data. While writing data, after a predetermined time, the write procedure causes switch 502 to change from supplying the open-loop PDO signal, to supplying the closed-loop PDO signal to the level-shift amplifier 340. In an alternate embodiment, the write procedure causes switch 502 to change from supplying the open-loop PDO signal, to supplying the closed-loop PDO signal to the level-shift amplifier 340 after a predetermined number of EFM symbols have been recorded.

Those skilled in the art will appreciate that the invention is also applicable to other disk drive systems including CD-RW, magneto-optical and magnetic disk drives.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of writing on a disk, comprising:
   writing user data to a disk with a closed-loop control during a normal write sequence;
   temporarily writing user data to said disk with an open-loop control after abortion of said normal write sequence;
   adjusting current which controls laser power using a closed loop control comprising:
      storing a reference power value;
      sensing an actual laser power being used;
      calculating a closed-loop deviation between the reference power value and the actual laser power being used, the closed loop deviation used to calculate in a closed loop an adjustment to the actual laser power.

2. The method of claim 1, wherein said step of temporarily writing user data to said disk with the open-loop control is performed in response to a write power value measured during the normal write sequence.

3. The method of claim 2, wherein said step of temporarily writing user data to said disk with open-loop control is performed in response to a write power value that is periodically updated during said normal write sequence.

4. The method of claim 2, wherein said step of temporarily writing user data to said disk with open-loop control is performed in response to a write power value that is derived from an initial write power value and a measured temperature value obtained during said normal write sequence.

5. The method of claim 7, further comprising:
   gradually transferring a write power to the closed-loop control after a laser power reaches a write power level with the open-loop control.

6. The method of claim 5 wherein the open loop control is used to increase the laser power to a writing level, and wherein using the open-loop control takes nano-seconds for the laser power to reach said writing level.

7. A circuit, to write user data on a disk, comprising:
a write head,
a drive circuit to provide power to said write head to write data on a disk; and
a control circuit connected to said drive circuit, said control circuit including a closed-loop control to supply power to said drive circuit during a normal user data write operation, and an open-loop control to temporarily supply power to said drive circuit to restart a user data write operation after abortion of the normal user data write operation;
wherein the closed loop control is an automatic power control circuit (APC) used to adjust current which controls laser power, wherein the APC comprises:
a reference power register storing a reference power value;
a receiver to sense an actual laser power being used; and
a deviation differential amplifier to receive said reference power value, the actual laser power being used, and a current power, and to calculate a closed-loop deviation, the closed loop deviation used to calculate in a closed loop an adjustment to the actual laser power.

8. The circuit of claim 7, further comprising a memory to store a closed loop deviation value for write recovery.

9. The circuit of claim 8, further comprising an open loop deviation register, a value in the open loop deviation register determining whether the circuit functions as a closed loop or an open loop.

10. The circuit of claim 9, wherein if the value of the open loop deviation register is the same as the closed loop deviation value, said automatic power control circuit operates in closed loop mode.

11. The circuit of claim 7, further comprising:
a write procedure to initiate the storage of a location where a write is aborted.

12. The circuit of claim 7, wherein the open loop control is used to increase a laser power to a writing level, and wherein using the open loop control takes nano-seconds for the laser power to reach said writing level.

13. The circuit of claim 7, wherein said control circuit includes a write power register to store a write power value used to operate said drive circuit in an open-loop mode.

14. The circuit of claim 13, wherein said control circuit includes a circuit to periodically update said write power value.

15. The circuit of claim 13, wherein said control circuit includes a circuit to calculate said write power value based upon an initial write power value and a measured temperature value obtained during said normal user data write operation.

16. A system to write user data on a disk comprising:
a reference power value register to set a reference power value during closed loop operations, wherein the reference power value is set to zero during open loop operation, and gradually increased to a predetermined reference power value to transfer operation from open-loop control to closed-loop control; and
an automatic power control circuit to write the user data to a disk with a closed-loop control during a normal write sequence and during a write restart operation to temporarily write the user data to the disk with an open-loop control.

17. The system of claim 16, further comprising:
an open-loop deviation register to set a laser power during the open-loop control; and a write procedure to initiate the storage of a laser power used during the normal write sequence in the open-loop deviation register.

18. The system of 16, further a memory to store a closed loop deviation value for write recovery.

19. The system of claim 18, further comprising an open loop deviation register, a value in the open loop deviation register determining whether the circuit functions as a closed loop or an open loop.

20. The system of claim 19, wherein if the value of the open loop deviation register is the same as the closed loop deviation value, said automatic power control circuit operates in closed loop mode.

21. A method of writing data on a disk, comprising:
writing a first subset of user data on a disk, wherein an amount of write power to write said first subset of user data is adjusted in a closed-loop operation;
measuring a write-power signal representing said amount of write power to write said first subset of user data;
writing a second subset of said user data on said disk in an open-loop operation using said measured write power, wherein said second subset of user data is adjacent to said first subset of user data;
adjusting current which controls laser power using a closed loop control comprising calculating a closed-loop deviation between a reference power value and an actual laser power being used, the closed loop deviation used to calculate in a closed loop an adjustment to an actual laser power.

22. The method of claim 21, wherein said writing said second subset of said user data initially begins writing said second subset of said user data using said measured write power in a substantially open-loop operation, and transitions to write said second subset of user data in a closed-loop operation.

23. The method of claim 21, wherein said measuring step includes the step of periodically measuring said write-power signal during said closed-loop operation.

24. The method of claim 21, wherein said measuring step includes the step of deriving said write-power signal from an initial write power value and measured temperature value obtained during said closed-loop operation.

* * * * *